United States Patent [19]

Blackburn

[11] Patent Number: 5,661,381
[45] Date of Patent: Aug. 26, 1997

[54] APPARATUS FOR EXTERNAL INDUCTANCE SENSING FOR VARIABLE-RELUCTANCE MOTOR COMMUTATION

[75] Inventor: Scott E. Blackburn, Temperance, Mich.

[73] Assignee: Dana Corporation, Toledo, Ohio

[21] Appl. No.: 601,922

[22] Filed: Feb. 15, 1996

[51] Int. Cl.$^6$ ................................ H02K 11/00; H02P 8/00
[52] U.S. Cl. ........................ 318/254; 318/138; 318/701
[58] Field of Search ................................ 318/139, 138, 318/245, 254, 439, 701, 696, 798, 799, 807, 811, 706, 646, 603, 618

[56] References Cited

U.S. PATENT DOCUMENTS

| | | | |
|---|---|---|---|
| 4,072,888 | 2/1978 | Bechtle, et al. | |
| 4,417,189 | 11/1983 | Overfield. | |
| 4,595,865 | 6/1986 | Jahns | 318/254 |
| 4,687,961 | 8/1987 | Horber | 310/186 |
| 4,777,419 | 10/1988 | Obradovic. | |
| 4,791,343 | 12/1988 | Ahrendt. | |
| 4,904,917 | 2/1990 | Hakluytt. | |
| 4,949,027 | 8/1990 | Baur. | |
| 5,138,244 | 8/1992 | Bahn | 318/701 |
| 5,260,635 | 11/1993 | Bahn | 317/701 |
| 5,274,287 | 12/1993 | Bahn | 318/701 |
| 5,298,846 | 3/1994 | Shimizu et al. | |
| 5,319,297 | 6/1994 | Bahn | 318/701 |
| 5,329,195 | 7/1994 | Horber et al. | 310/68 B |
| 5,350,988 | 9/1994 | Le | 318/618 |

Primary Examiner—Paul Ip
Attorney, Agent, or Firm—Dykema Gossett PLLC

[57] ABSTRACT

An apparatus for controlling commutation of a three-phase variable reluctance machine includes a sensor, a sampling circuit, an inductance waveform generating circuit, a phase advance circuit, a threshold signal generating circuit, and an output comparator. The sensor includes a stack of several laminations which are identical to the motor laminations that form the motor stator, and is mounted at one end thereof. The motor includes a plurality of stator windings forming a plurality of corresponding machine phases. The sensor also includes a plurality of sensor windings electrically isolated from the stator windings. Each sensor winding is associated with a corresponding stator winding. Each sensor winding also has an inductance characteristic that varies according to an actual position of the rotor. The sampling circuit is coupled to the sensor windings for selectably energizing at least one of the windings to generate a plurality of pulses indicative of the current passing through the energized sensor winding. The inductance waveform generating circuit includes a sample and hold device responsive to these pulses and outputs a generally sinusoidal signal indicative of an inductance waveform associated with the sensor winding. The phase advance circuit provides a turn-on signal having a magnitude that is modulated as a function of the motor speed. The threshold generating circuit comprises a switch operated in accordance with machine phase crossover transitions for selecting either the turn-on threshold, or a separately generated turn-off threshold voltage. The threshold voltage is compared with the inductance waveform, and a digital commutation signal is generated for the motor phase corresponding to the sampled sensor winding.

19 Claims, 3 Drawing Sheets

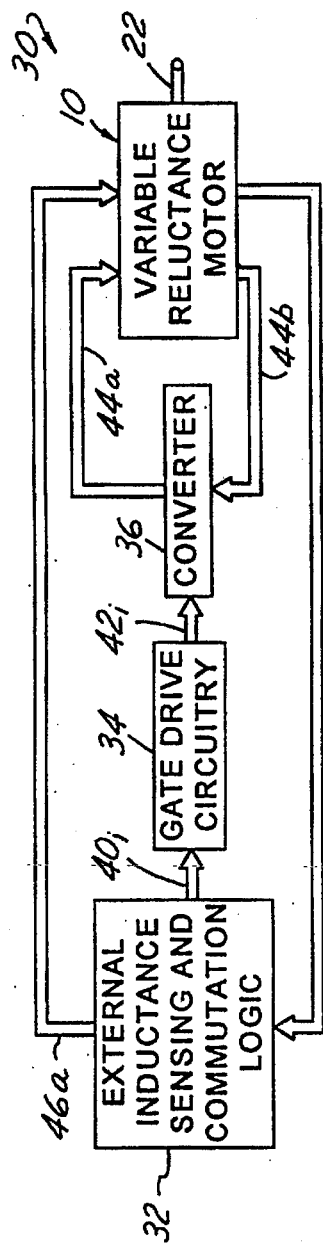
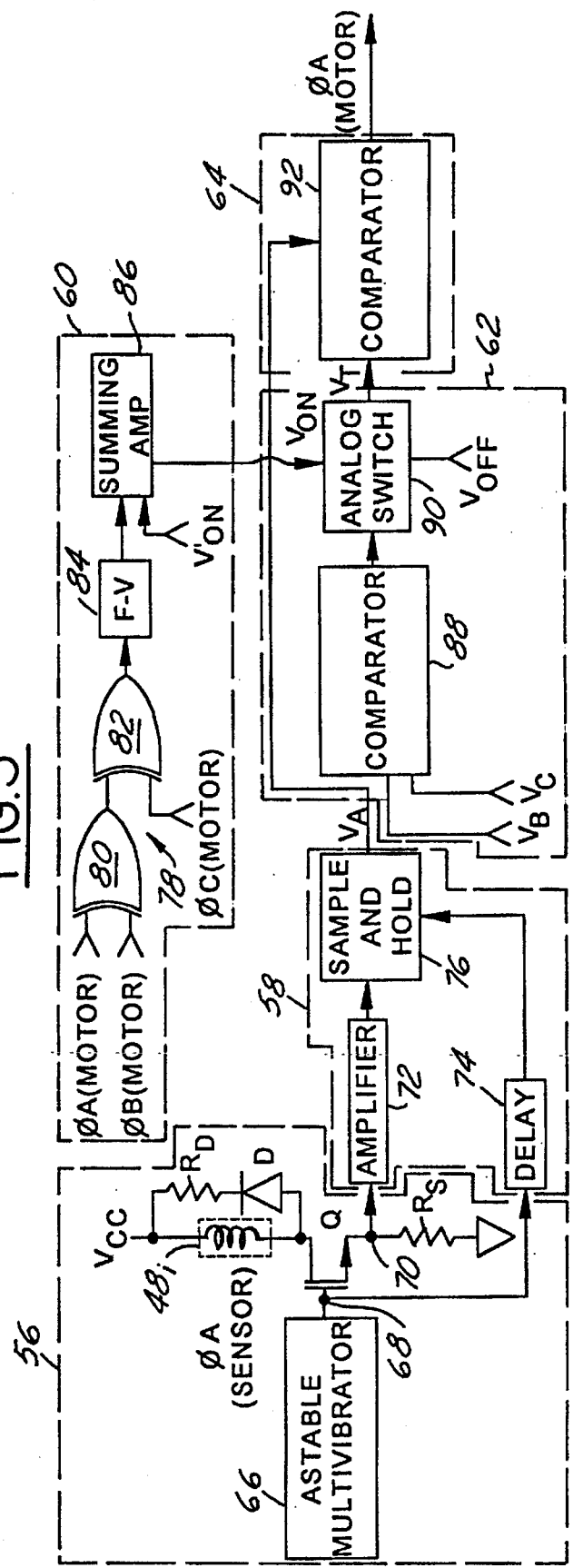

APPARATUS FOR EXTERNAL INDUCTANCE SENSING FOR VARIABLE-RELUCTANCE MOTOR COMMUTATION

BACKGROUND OF THE INVENTION

1. Technical Field

This invention relates generally to a system for controlling a variable-reluctance (VR) motor, and more particularly, to an apparatus for external inductance sensing for controlling VR motor commutation.

2. Discussion of The Related Art

Variable-reluctance (VR), or as they are alternatively known, switched-reluctance (SR) machines have been the subject of increased investigation due to their many advantages, which makes it suitable for use in a wide variety of situations. A VR machine operates on the basis of varying reluctance in its several magnetic circuits. In particular, such machines are generally doubly salient motors—that is, they have teeth or poles on both the stator and the rotor. The stator teeth have windings which form machine phases of the motor. In a common configuration, stator windings on diametrically opposite poles are connected in series to form one machine phase.

When a stator phase is energized, the closest rotor pole pair is attracted towards the stator pole pair having the energized stator winding, thus minimizing the reluctance of the magnetic path. By energizing consecutive stator windings (i.e., machine phases) in succession, in a cyclical fashion, it is possible to develop torque, and thus rotation of the rotor in either a clockwise, or counter-clockwise direction.

As further background, the inductance of a stator winding associated with a stator pole pair varies as a function of rotor position. Specifically, the inductance varies from a lower level when a rotor pole is unaligned with a corresponding stator pole, where it rises to an upper or maximum level when the rotor pole and stator pole are in alignment. Thus, when the rotor pole rotates and sweeps past a stator pole, the inductance of the stator winding varies through lower-upper-lower inductance levels. This inductance-versus-rotor position characteristic is particularly relevant for controlled operation of the motor. Specifically, current flowing through the stator winding must be switched on prior to (i.e., advanced), and maintained during the rising inductance period to develop positive torque. Since positive phase current during the decreasing inductance interval produces a negative or breaking torque, the phase current must be switched off before this interval occurs to avoid negative torque. Accordingly, rotor position sensing is an integral part of a closed-loop variable-reluctance motor drive system so as to appropriately control torque generation.

The prior art has taken two fundamentally opposing approaches in determining rotor position: direct methods, and indirect methods. Direct methods include the use of direct rotor position sensors, such as optical encoders and Hall effect devices, which are commonly used in closed-loop motor drives for the purpose of phase current commutation. However, sensors of this type increase the cost of the drive system, and are not sufficiently rugged, (i.e., are relatively unreliable) in automotive applications.

Indirect methods were investigated, partially, due to the shortcomings of the above-mentioned direct techniques. In one indirect method, advanced control theory techniques are used, such as an observer-based state variable model, to estimate rotor position using operating parameters such as phase current, voltage, or inductance of deenergized stator windings. However, one disadvantage of these types of methods is that they require an expensive processing device, such as a microprocessor, to acquire and evaluate the numerous samples needed to determine the rotor position. Further, performance is generally poor with these methods at the outer limits of the motor operating range (i.e., very low speed, and high speed conditions).

Accordingly, there is a need to provide an improved apparatus for commutation of a variable-reluctance machine that minimizes or eliminates one or more of the problems as set forth above.

SUMMARY OF THE INVENTION

The present invention provides an improved apparatus for controlling commutation of a variable or switched-reluctance machine using external inductance sensing. The apparatus is suitably adapted for use with a VR motor that includes a rotor, a stator, and a plurality of stator windings forming a plurality of machine phases. In one aspect of the invention, a sensor is provided for use with the apparatus, and is formed from a plurality of laminations (which may be identical to the motor laminations), and includes a plurality of sensor windings independent from the stator windings. In particular, each sensor winding is associated with a corresponding stator winding and has an inductance characteristic that varies according to an actual position of the rotor.

The apparatus for controlling commutation includes means for energizing at least one of the sensor windings and generating in response thereto a current indicative signal representative of the current passing through the energized sensor winding. The apparatus further includes means for generating an inductance indicative signal, using the current indicative signal, that is representative of an inductance waveform associated with the energized sensor winding. The inductance waveform is a function of the actual rotor position. Finally, the control apparatus includes means for comparing the inductance waveform with a threshold signal for generating a commutation signal to control energization of the stator winding corresponding to the energized sensor winding.

A device in accordance with a preferred embodiment of this invention is cost effective and efficiently commutates a VR motor over a wide range of speeds (i.e., turn-on and turn-off angles are easily initialized and automatically adjusted according to the speed of the motor). This represents a significant improvement over prior art methods, which lack flexibility and are only capable of commutating a VR motor over a limited speed range.

These and other features and objects of this invention will become apparent to one skilled in the art from the following detailed description and accompanying drawings illustrating features of this invention by way of example.

BRIEF DESCRIPTION OF THE DRAWINGS

FIG. 3 is a simplified, partial, block diagram view of a motor drive system in accordance with the present invention.

FIG. 5 is a simplified, partial schematic and block diagram view showing, in greater detail, a phase A logic block portion of the sensing and commutation logic illustrated in FIG. 4.

DETAILED DESCRIPTION OF THE PREFERRED EMBODIMENTS

Figure 1:
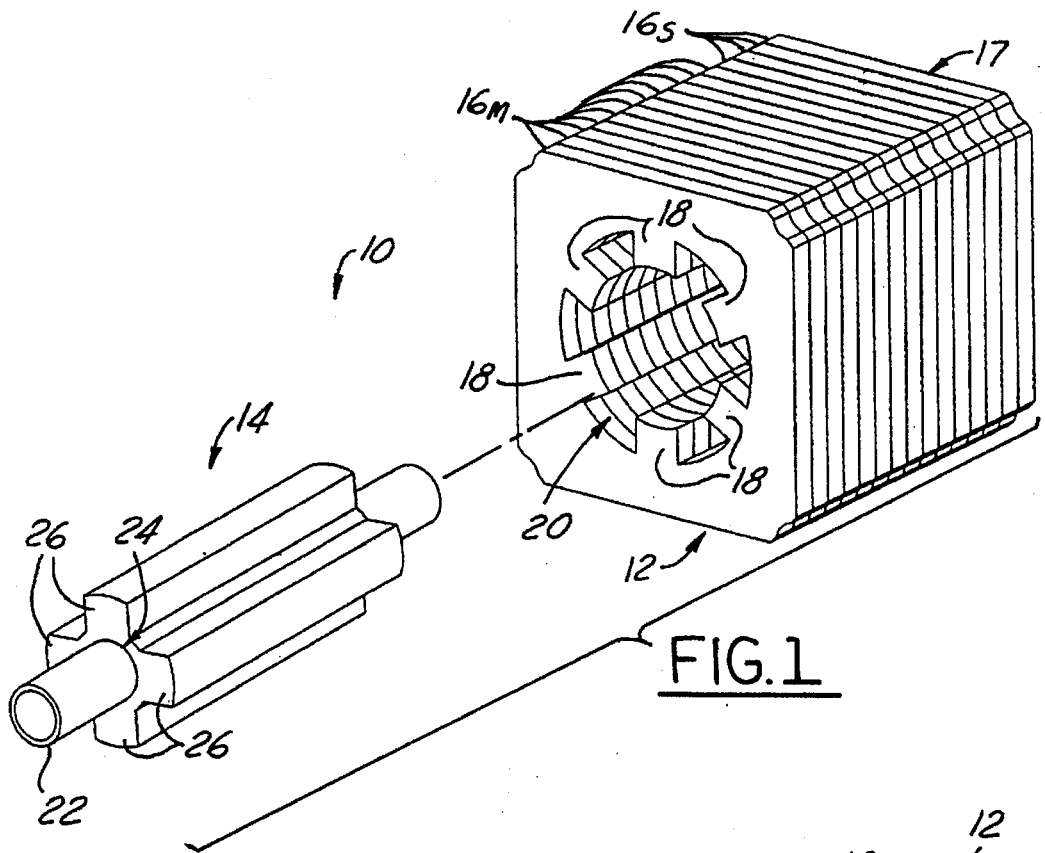
FIG. 1 is an exploded, perspective view of a portion of a variable reluctance electric motor suitable for use in connection with a preferred embodiment of the present invention.

Referring now to the drawings wherein like reference numerals are used to identify identical components in the various views, FIG. 1 shows the major mechanical components of a variable-reluctance (VR) electric motor 10, sometimes referred to as a switched-reluctance (SR) motor, which includes a stator assembly 12, and a rotor assembly 14.

Although the invention will be described and illustrated in the context of a variable-reluctance electric motor 10, it will be appreciated that this invention may be used in conjunction with another well-known electric motor structures. Stator assembly 12, in a preferred embodiment, comprises a first plurality of laminations $16_m$. A second plurality of laminations $16_s$ is disposed adjacent the first plurality of laminations $16_m$ to define a sensor 17. The laminations 16 are formed using a magnetically permeable material, such as iron. Individual ones of laminations $16_m$, and $16_s$ may be identical, and are identical in a constructed embodiment. The sensor laminations, however, can be formed in other configurations to provide alternative inductance characteristics. Although, in the illustrated embodiment, the sensor laminations $16_s$ are mounted on one end of the stator assembly 12, it should be appreciated that other configurations are available that would remain within the spirit and scope of this invention.

Stator 12 is generally hollow and cylindrical in shape. A plurality of radially inwardly extending poles or teeth 18 are formed on stator 12 (via laminations 16) and extend throughout the length thereof. Similarly, poles 18 are also formed on sensor 17 (via laminations $16_s$) and extend throughout the length of sensor 17. Poles 18 of stator 12 and sensor 17 are aligned. Poles 18 are preferably provided in diametrically opposed pairs. For purposes of clarity, six (6) poles 18 are provided. It should be appreciated, however, that a greater or lesser number of poles 18 may be provided in any particular configuration. For example, in a constructed embodiment, 6 stator poles (with two teeth per pole for a total of 12 teeth) are provided.

Each of the poles 18 may have a generally rectangular shape, when taken in cross-section. The radially innermost surfaces of poles 18 are slightly curved so as to define an inner diameter to define bore 20. Bore 20 is adapted in size to receive rotor assembly 14.

Rotor assembly 14, when assembled (see FIG. 2) is coaxially supported within stator 12/sensor 17 for relative rotational movement by conventional means. For purposes of illustration only, rotor assembly 14 may be supported by conventional end bells (not shown) secured to the longitudinal ends of stator 12/sensor 17. Rotor assembly 14 includes a generally cylindrical shaft 22, and rotor 24. Shaft 22 may be, as illustrated, hollow. Rotor 24 is secured to shaft 22 for rotation therewith. For example, rotor 24 may be secured to shaft 22 by means of spline (not shown), or other conventional means well-known in the art. Thus, it should be appreciated that shaft 22, and rotor 24 rotate together as a unit.

Rotor 24 includes a plurality of poles 26 formed on an outer surface thereof. Each pole 26 extends radially outwardly from the outer surface thereof and is formed having a generally rectangular shape, taken in cross-section. Rotor poles 26 extend longitudinally throughout the entire length of the outer surface of rotor 24. The radially outermost surfaces of rotor poles 26 are curved so as to define an outer diameter, adapted in size to be received within the inner diameter defining bore 20. That is, the outer diameter formed by the poles 26 is slightly smaller than the inner diameter defined by the radially innermost curved surfaces of stator poles 28. Rotor poles 26 are also preferably provided in diametrically opposed pairs. Four (4) rotor poles 26 are provided on the illustrated rotor assembly 14. However, it should be appreciated that a greater or lesser number of rotor poles 23 may be provided. For example, in a constructed embodiment, a 14 tooth rotor is provided. For VR motors, in general, the number of rotor poles 26 differs from the number of stator poles 18. Rotor 24, including poles 26, may be formed from a magnetically permeable material, such as iron.

Figure 2:
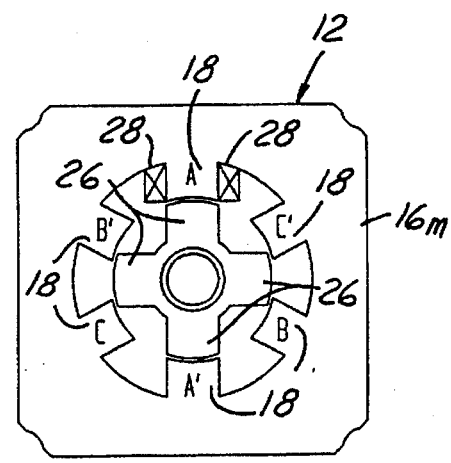
FIG. 2 is a diagrammatic, exaggerated, sectional view of a variable-reluctance electric motor illustrating the relative positions of a stator, and rotor portions thereof.

Referring now to FIG. 2, a diagrammatic view of a cross-section through an assembled motor 10 is illustrated. In particular, as referred to above, poles 18 occur in pairs: i.e., A A', B B', and C C'. The rotor poles 26 also appear in pairs. Stator windings 28 (shown only on stator pole A for clarity) of diametrically opposite poles (e.g., A and A') associated with stator 12, are connected in series to form one machine phase. Thus, the windings 28 on poles A, and A' are referred to as "machine phase A" of VR motor 10. In the illustrated example, VR motor 10 also has machine phase B, and a machine phase C. Each of these three machine phases may be energized individually, which, when done in a controlled manner, provides for rotation of rotor 24. Although a three-phase machine is described and illustrated, a machine having more phases is contemplated as falling within the present invention.

In a like manner to that illustrated in FIG. 2, sensor 17, as defined by laminations $16_s$, also has a plurality of sensor windings associated with each pole 18. In the preferred embodiment, sensor windings (shown schematically in FIG. 5 as winding $48_i$) associated with diametrically opposite poles are connected in series to form a single electrical sensor winding. Thus, in addition to the winding 28 for pole pair A A' formed by laminations $16_m$, a sensor winding is also provided for pole pair A A' formed by laminations $16_s$. That is, pole pairs A A', B B', and C C' formed by the plurality of laminations $16_s$, are each wound with a respective sensor winding, which corresponds to the stator windings 28 associated with pole pairs formed by laminations $16_m$. The stator windings and the sensor windings are electrically isolated. Each one of the plurality of sensor windings 48 has an inductance characteristic that varies according to the actual position of rotor 24. Likewise, each stator winding also has an inductance characteristic that varies according to the actual position of rotor 24. Since rotor 24, as installed, is adjacent to both pluralities of laminations $16_m$ and $16_s$ and corresponding windings, the inductance characteristic of the sensor winding provides a good model of the inductance characteristic of the corresponding stator winding. Accordingly, the sensor winding can be used to control energization thereof.

Referring now to FIG. 3, an apparatus 30 for controlling commutation of variable-reluctance electric motor 10 is illustrated, and includes external inductance sensing and commutation logic 32, power gate drive circuitry 34, converter circuitry 36, and VR motor 10. External inductance sensing and commutation logic 32 uses external inductance sensor 17 to monitor the rotor position of VR motor 10. Block 32 makes use of the variation in incremental phase inductance in the sensor windings of VR motor 10 to sense rotor position for purposes of generating machine phase commutation signals $40_1, \ldots 40_n$, where n indicates the number of phases of the machine being controlled.

Gate drive circuitry 34 is provided for interfacing logic level commutation signals $40_i$ generated by block 32 with the power-level signals required of converter 36. Gate drive circuitry 34 is conventional, and well-known in the art.

Converter 36 is responsive to the power-level drive signals from gate drive circuitry 34 to energize selected machine phases (i.e., stator windings 28) in accordance with predetermined control criteria. Converter 36 may take any one of the plurality of well-known configurations known in the art. In connection with this energization function, FIG. 3 shows stator winding energizing paths 44a, and 44b. External inductance sensing and commutation generation logic 32 energizes sensor windings $48_i$ (see FIG. 5) by way of sensor winding energizing paths 46a, and 46b, as also shown in FIG. 3.

Figure 4:
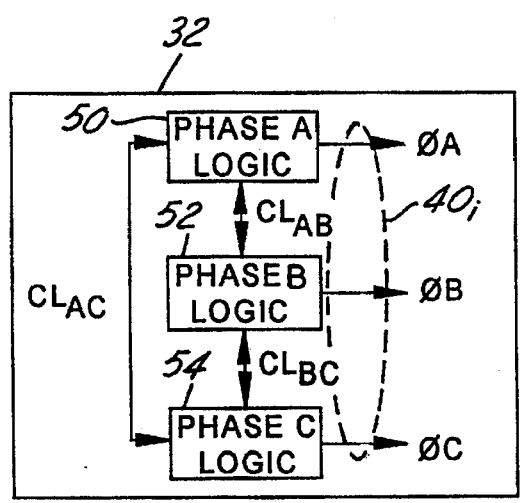
FIG. 4 is a detailed, simplified, block and schematic diagram view showing, in greater detail, an external inductance sensing and commutation logic portion of the motor drive system illustrated in FIG. 3.

Referring now to FIG. 4, in the illustrated embodiment, external inductance sensing and commutation generation logic 32 includes machine phase A logic 50, machine phase B logic 52, and machine phase C logic 54, wherein communication between each of the logic blocks 50, 52, and 54 is accomplished by way of communication lines $CL_{ab}$, $CL_{bc}$, and $CL_{ac}$. Phase A logic 50 generates a commutation signal for machine phase A of motor 10, indicated at $\Phi A$, phase B logic 52 generates a commutation signal for machine phase B, indicated at $\Phi B$, and phase C logic 54 generates a commutation logic for machine phase C of motor 10, indicated at $\Phi C$. Signals $\Phi A$, $\Phi B$, and $\Phi C$, collectively define commutation signals $40_i$, as shown in FIG. 3. It should be understood, as detailed above, that although a three-phase motor/sensor structure is described for purposes of simplicity, any number of phases could be utilized and would fall within the spirit and scope of this invention. In particular, it should be understood that a block, similar to blocks 50, 52, and 54, is needed in the illustrative embodiment for each phase of external inductance sensor 17.

Referring now to FIG. 5, a simplified schematic and block diagram view is shown illustrating, in greater detail, phase A logic block 50 of FIG. 4. Each one of the logic blocks 52, and 54 also substantially comprise the circuit of FIG. 5, with appropriate changes to the input signals to be described in detail below. Circuitry 50 includes an energizing circuit 56, inductance indicative signal generating circuit 58, a phase advance circuit 60, a threshold signal generating circuit 62, and a comparing circuit 64.

Means or circuit 56 is provided for energizing a sensor winding $48_i$ and generating in response thereto a chopped, analog signal representative of an electrical current passing through the energized sensor winding. Energizing circuit 56 includes an astable multivibrator 66, a switching means, such as metal-oxide-semiconductor field effect transistor (MOSFET) Q, sense resistor $R_s$, dissipation resistor $R_D$, and diode D. Multivibrator 66 is used to drive MOSFET Q and is provided for chopping the current passing through the winding of phase A ($\Phi A$) of sensor 17, at a frequency substantially higher than the motor commutation frequency. In particular, in a constructed embodiment, the maximum motor commutation frequency is 900 Hz, while multivibrator 66 generates an output signal at node 68, which is connected to the base terminal of MOSFET Q, to chop the current at a frequency of approximately 35 kHz. Resistor $R_d$ and diode D are series-connected and are used to quickly dissipate the energy in coil or winding $48_i$ so that the chopping/sampling frequency of circuits 56, 58 can be relatively high. Sense resistor $R_s$ is connected to the source terminal of FET Q for providing an output voltage on node 70 that is proportional to the magnitude of the current pulses. In effect, circuit 56 is a sampling circuit coupled to the sensor windings $48_i$ for selectively energizing at least one of the sensor windings to generate a plurality of current pulses wherein the current pulses are converted to a corresponding series of voltage pulses representative of the current passing through the energized sensor winding.

Means or circuit 58 is responsive to the chopped current signal and is provided for generating an inductance indicative signal representative of an inductance waveform associated with the energized sensor winding. Circuit 58 includes an amplifier 72, a delay circuit 74, and a sample and hold circuit 76. The amplifier 72 includes an input coupled to receive the chopped current signal appearing at node 70. The amplifier 72 then amplifies the chopped signal in a manner well-known in the art. The sample and hold circuit 76 is also a conventional structure, and is fed the output of amplifier 72. The sample and hold circuit 76 is operable to sample the amplifier 72 output at predetermined times according to a sampling signal produced by delay circuit 74. The sample and hold circuit 76 generates an inductance indicative signal associated with machine phase A, and which is indicated in the Figures at $V_A$. Delay circuit 74 functions to delay the multivibrator 66 output appearing at node 68 by a predetermined amount in order to generate the sampling signal. The amount of delay is such that the sampling by sample and hold circuit 76 occurs just before multivibrator 66 turns off MOSFET Q. Thus, the amount of delay introduced by circuit 74 is, in one respect, a function of the operating frequency of multivibrator 66. For example, as the frequency of operation of multivibrator 66 goes up, the chopping period decreases, and therefore so does the delay amount to maintain sampling just before turn-off. Delay circuit 74 is conventional in the art.

Phase advance circuit 60 includes a logic circuit 78 having a first exclusive-or (XOR) gate 80, and second exclusive-or (XOR) gate 82, a frequency-to-voltage converter 84, and a summing amplifier 86.

For three-phase motor 10, as in the illustrated embodiment, three (3) circuits 50, 52, and 54 operate simultaneously to generate commutation signals $\Phi A$, $\Phi B$, and $\Phi C$ for machine phases (i.e., stator windings 28) A, B, and C of motor 10, respectively. Accordingly, these commutation signals are simultaneously available for use between each of the blocks 50, 52, and 54 (see also FIG. 4). The present invention makes use of these signals to calculate a phase advance based on rotor speed. Specifically, logic circuit 78 is responsive to predetermined commutation signals associated with the plurality of machine phases of the motor for generating a first motor speed signal at the output of gate 82 whose frequency corresponds to the rotational velocity of the rotor 24. This should be apparent to one of ordinary skill in the art. Frequency-to-voltage converter 86 is then operative to convert the first motor speed signal to another, second motor speed signal whose magnitude (i.e., DC output) also corresponds to the rotational velocity of the rotor 24. Summing amplifier 86 adds the output of frequency-to-voltage converter 84, with a preselected advance signal $V_{ON}'$, to generate an the energizing threshold signal $V_{on}$. The preselected advance signal is a fixed DC signal used to set the voltage threshold (which corresponds to a rotor position in electrical degrees) level at which commutation of machine phase A occurs. Thus, the output $V_{on}$ is the base threshold level $V_{ON}'$, modulated as a function of the motor rotor speed.

Threshold signal generating circuit 62 includes a comparator 88, and an analog switch 90. The comparator 88 is responsive to the inductance indicative signal associated with machine phase B, $V_B$, as well as the inductance indicative signal associated with machine phase C, $V_C$, for generating a switch signal. The switch signal controls switch 90 to select one of either the energizing threshold signals $V_{on}$, or deenergizing threshold signal $V_{off}$. The switch signal changes state when $V_B$ and $V_C$ crossover, and is thus indicative of a machine phase crossover point.

Means or circuit 64 is provided for comparing the inductance indicative signal $V_A$ with the threshold signal $V_T$ for generating a commutation signal $\Phi A$ to control energization of the stator winding corresponding to the energized sensor winding. Comparing circuit 64 includes an analog comparator 92 for activating the commutation signal $\Phi A$ associated with machine phase A when $V_A$ is greater than the threshold signal $V_T$. Thus, circuit 50, shown in FIG. 5, outputs a digital commutation signal $\Phi A$. It should be understood that the foregoing description assumes operation in one direction only—A, B, C, A, B, C, etc.

Figure 6:
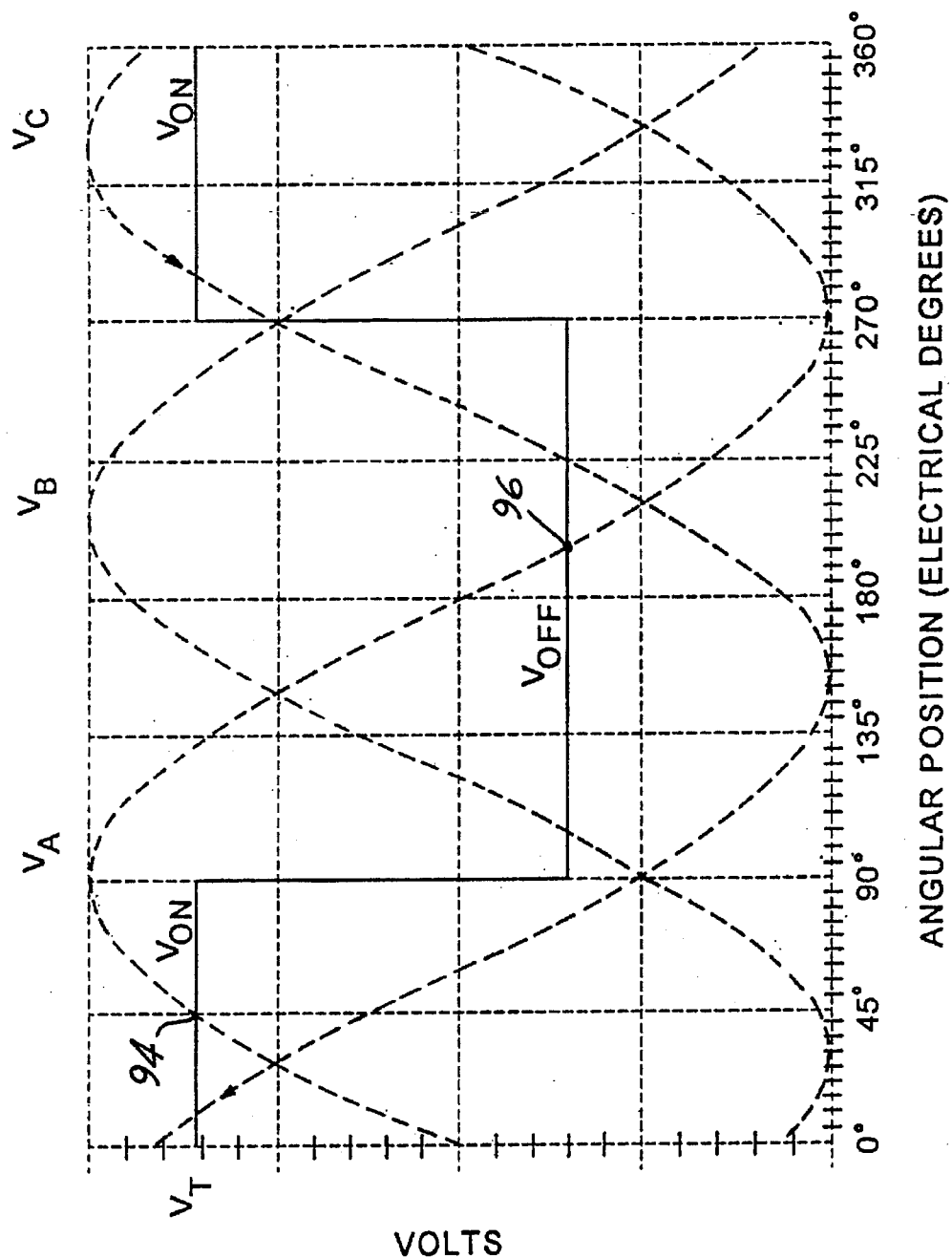
FIG. 6 is a simplified, timing diagram view illustrating the relationship between the several inductance indicative waveforms corresponding to the various machine phases, relative to a threshold voltage, according to a preferred embodiment of the present invention.

FIG. 6 illustrates a timing diagram of the relationships between signals $V_A$, $V_B$, and $V_C$, relative to the threshold signal $V_T$. The threshold signal $V_T$ allows for independent control of the turn-on and turn-off angles of the machine phase by using analog switch 90 to toggle between two references according to the rotor position (as derived by external sensing incremental phase inductance). The turn-on threshold ($V_{on}$) is proportional to the speed of the motor rotor 24 (through the use of frequency-to-voltage converter 84 and summing amplifier 86) in order to provide automatic phase advance. Sampling circuitry will work down to, and including, zero speed and will provide accurate commutation signals over a wide range of speeds.

In particular, as shown in FIG. 6, several of the inductance indicative signals $V_A$, $V_B$ and $V_C$ are shown. These signals are generally sinusoidal and are representative of the inductance waveform of the corresponding sensor winding. As such, these signals are also representative of the rotor position. For example, in the graph motor phase A (i.e., stator winding 28 for A A') is energized between point 94 ($V_A > V_T$), and point 96. Further, as rotor speed varies, $V_{on}$ also varies accordingly. Thus, by adjusting $V_{on}$, by way of phase advance circuit 60, the intersection of $V_A$, and $V_{on}$ will be advanced or retarded relative to the position shown in FIG. 6.

As also can be seen, the threshold voltage $V_T$ changes from its energizing value $V_{on}$, to its deenergizing value $V_{off}$ at a point where the traces of $V_B$, and $V_C$ intersect for crossover (i.e., at approximately 90°). Likewise, a similar transition occurs at 270°.

It should be appreciated, that since blocks 50, 52, and 54 (see FIG. 4) are operating simultaneously, all of the motor machine phases (i.e., 3 in the illustrated embodiment) can be controlled simultaneously to accomplish complete control of the rotation of rotor 24.

A control apparatus in accordance with the present invention accomplishes phase commutation by the use of an external inductance sensor 17, which monitors the rotor position of VR motor 10. The circuit makes use of the variation in incremental phase inductance in the motor to sense rotor position for the purpose of phase commutation. The sensor comprises a plurality of laminations $16_s$, which are identical to the motor laminations $16_m$, and, in one embodiment, is mounted on one end of the motor. The circuit accomplishes commutation by simultaneously chopping each of the phases in the sensor at current levels which are a small fraction of the motor current, and monitoring the resulting current peaks of the pulses after fixed intervals of time. All of the sampling and signal processing is accomplished with analog circuitry to eliminate the need for an expensive microprocessor. The sensing circuitry outputs a digital signal for each of the motor phases for direct control of the phase current commutation. Further, since the sensor is external (i.e., not part of the stator windings), the circuitry 50 can be kept distinct and independent from the circuitry to energize the stator windings. This feature permits optimization of the circuitry 50, which would otherwise have to be incorporated into the stator winding energization circuitry.

The preceding description is exemplary rather than limiting in nature. A preferred embodiment of this invention has been disclosed to enable one skilled in the art to practice the invention. Variations and modifications are possible without departing from the purview and spirit of this invention; the scope of which is limited only by the appended claims.

I claim:

1. An apparatus for controlling commutation of a variable reluctance machine wherein the machine includes a rotor, a stator, a plurality of stator windings defining a plurality of machines phases and a sensor having a plurality of sensor windings, comprising:

means for energizing the sensor winding that is independent of and corresponds to one of said machine phases and for generating in response thereto a first signal representative of a current passing through said energized sensor winding;

means responsive to said first signal for generating a second signal indicative of an inductance waveform associated with said energized sensor winding, said inductance waveform being a function of an actual position of the rotor; and, means for comparing said second signal with a threshold signal for generating a commutation signal to control energization of at least one of the stator windings to thereby control rotation of the rotor.

2. The apparatus of claim 1 wherein said energizing and generating means includes an astable multivibrator for generating an output signal at a first frequency, a switch responsive to said multivibrator output signal for selectively energizing said sensor winding to generate current pulses, and a sense resistor connected to said switch for providing a voltage proportional to the magnitude of said current pulses.

3. The apparatus of claim 2 wherein said first frequency is substantially higher than a maximum commutation frequency of the variable reluctance machine.

4. The apparatus of claim 2 wherein said switch is a field-effect transistor (FET).

5. The apparatus of claim 2 further comprising a dissipation resistor series-connected with a diode, wherein said dissipation resistor and said diode are connected in parallel with said sensor winding for dissipating said current to thereby permit an increased first frequency.

6. The apparatus of claim 1 wherein said means for generating said second signal includes an amplifier, a delay circuit, and a sample and hold circuit, said amplifier having an input coupled to receive said first signal, said delay circuit being operable for delaying said multivibrator output by a predetermined amount to generate a sampling signal, said sample and hold circuit being operable to sample said amplifier output according to said sampling signal to generate said second signal.

7. The apparatus of claim 1 said comparing means includes a comparator.

8. The apparatus of claim 1 further including means for generating said threshold signal, said threshold signal generating means including a comparator for generating a switch signal indicative of a machine phase crossover point, said threshold signal generating means further including an analog switch for selecting one of an energizing signal $V_{on}$ and a deenergizing signal $V_{off}$ according to said switch signal to generate said threshold signal.

9. The apparatus of claim 8 further including a phase advance circuit for generating said energizing signal $V_{on}$, said phase advance circuit including a logic circuit, a frequency-to-voltage converter, and a summing amplifier, said logic circuit being responsive to predetermined commutation signals associated with the plurality of machine phases for generating a first motor speed signal whose frequency corresponds to a rotational velocity of the rotor, said frequency-to-voltage converter being operable to convert said first motor speed signal to a second motor speed signal whose magnitude corresponds to said rotational velocity of the rotor, said summing amplifier being operable to add said second motor speed signal with a predetermined advance signal $V_{ON}'$ to generate said energizing signal $V_{on}$.

10. An apparatus for controlling commutation of a variable reluctance machine of the type including a rotor, a stator, and a plurality of stator windings defining a plurality of machines phases, comprising:

a sensor including a plurality of sensor windings independent from the stator windings wherein each sensor winding is associated with a corresponding stator winding, each sensor winding having an inductance characteristic that varies according to an actual position of the rotor;

means for energizing at least one of said sensor windings and generating in response thereto a chopped signal representative of an electrical current passing through said energized sensor winding;

means responsive to said chopped signal for generating an inductance indicative signal representative of an inductance waveform associated with said energized sensor winding, said inductance waveform being a function of said actual position of the rotor; and, means for comparing said inductance indicative signal with a threshold signal and for generating in response thereto a commutation signal to control energization of one of the plurality of stator windings that corresponds with said energized sensor winding to thereby control rotation of the rotor.

11. The apparatus of claim 10 wherein the stator comprises a first plurality of laminations, said sensor including a second plurality of laminations adjacent said first plurality of laminations, the rotor being adjacent to said first and second plurality of laminations.

12. The apparatus of claim 10 wherein said energizing and generating means includes an astable multivibrator for generating an output signal at a first frequency, a switch responsive to said multivibrator signal for selectively energizing said sensor winding to generate current pulses, and a sense resistor connected to said switch for providing a voltage proportional to the magnitude of said current pulses.

13. The apparatus of claim 12 wherein said first frequency is substantially higher than a maximum commutation frequency of the variable reluctance machine.

14. The apparatus of claim 12 further comprising a dissipation resistor series-connected with a diode, wherein said dissipation resistor and said diode are connected in parallel with said energized sensor winding for dissipating said current to thereby permit an increased first frequency.

15. The apparatus of claim 10 wherein said means for generating said inductance indicative signal includes an amplifier, a delay circuit, and a sample and hold circuit, said amplifier having an input coupled to receive said chopped signal for amplification thereto, said delay circuit being operable for delaying said multivibrator output by a predetermined amount to generate a sampling signal, said sample and hold circuit being operable to sample said amplifier output according to said sampling signal to generate and maintain said inductance indicative signal.

16. The apparatus of claim 10 further including means for generating said threshold signal, said threshold signal generating means including a comparator for generating a switch signal indicative of a machine phase crossover point, said threshold signal generating means further including an analog switch for selecting one of an energizing signal $V_{on}$ and a deenergizing signal $V_{off}$ according to said switch signal to generate said threshold signal.

17. The apparatus of claim 16 further including a phase advance circuit for generating said energizing signal $V_{on}$, said phase advance circuit including a logic circuit, a frequency-to-voltage converter, and a summing amplifier, said logic circuit being responsive to predetermined commutation signals associated with the plurality of machine phases for generating a first motor speed signal whose frequency corresponds to a rotational velocity of the rotor, said frequency-to-voltage converter being operable to convert said first motor speed signal to a second motor speed signal whose magnitude corresponds to said rotational velocity of the rotor, said summing amplifier being operable to add said second motor speed signal with a predetermined advance signal $V_{ON}'$ generate said energizing signal $V_{on}$.

18. An apparatus for controlling commutation of a variable reluctance machine of the type including a rotor, a stator, and a plurality of stator windings forming a plurality of machines phases, comprising:

a sensor including a plurality of sensor windings electrically isolated from the stator windings wherein each sensor winding is associated with a corresponding stator winding, each sensor winding having a respective inductance characteristic that varies according to an actual position of the rotor;

a sampling circuit coupled with said sensor windings for selectively energizing at least one of said sensor windings to generate a plurality of current pulses, said plurality of current pulses being representative of the current passing through said energized sensor winding;

a generator responsive to said current pulses for generating an inductance indicative signal representative of an inductance waveform associated with said energized sensor winding and said corresponding stator winding, said inductance waveform being a function of said actual position of the rotor; and, a comparator for comparing said inductance indicative signal and a threshold signal to generate in response thereto a commutation signal to control energization of said corresponding stator winding to thereby control rotation of the rotor.

19. The apparatus of claim 18 wherein the machine stator includes a first plurality of laminations, said sensor including a second plurality of laminations adjacent said first plurality.

* * * * *

UNITED STATES PATENT AND TRADEMARK OFFICE
CERTIFICATE OF CORRECTION

PATENT NO. : 5,661,381
DATED : Aug. 26, 1997
INVENTOR(S) : Blackburn

It is certified that error appears in the above-indentified patent and that said Letters Patent is hereby corrected as shown below:

Column 10, line 35, before "generate", please insert

--to--.

Signed and Sealed this

Seventh Day of October, 1997

Attest:

BRUCE LEHMAN

Attesting Officer

Commissioner of Patents and Trademarks